United States Patent
Niehaus et al.

[11] Patent Number: 5,189,665
[45] Date of Patent: Feb. 23, 1993

[54] PROGRAMMABLE CONFIGURABLE DIGITAL CROSSBAR SWITCH

[75] Inventors: Jeff A. Niehaus, Dallas; Stephen Li, Garland; Frank Laczko, Plano, all of Tex.

[73] Assignee: Texas Instruments Incorporated, Dallas, Tex.

[21] Appl. No.: 850,020

[22] Filed: Mar. 10, 1992

Related U.S. Application Data

[63] Continuation of Ser. No. 764,044, Sep. 23, 1991, abandoned, which is a continuation of Ser. No. 330,657, Mar. 30, 1989, abandoned.

[51] Int. Cl.$^5$ ............... H04Q 11/04; H04L 12/40
[52] U.S. Cl. ............... 370/458.1; 370/58.2; 370/58.3; 370/85.1
[58] Field of Search ............... 370/61, 58.2, 58.3

[56] References Cited

U.S. PATENT DOCUMENTS

| | | | |
|---|---|---|---|
| 4,084,236 | 4/1978 | Clelberg et al. | 364/200 |
| 4,099,234 | 7/1978 | Woods et al. | 364/200 |
| 4,404,556 | 9/1983 | Messina et al. | 370/59 |
| 4,475,187 | 10/1984 | Barabas | 370/59 |
| 4,539,564 | 9/1985 | Smithson | 370/67 |
| 4,807,183 | 2/1989 | Kung et al. | 364/900 |
| 4,817,082 | 3/1989 | Orsic | 370/58.1 |
| 4,852,083 | 7/1989 | Niehaus et al. | 370/58 |
| 4,862,451 | 8/1989 | Closs et al. | 370/60.1 |

OTHER PUBLICATIONS

Digest of Technical Papers, 1987 IEEE International Solid State Circuits Conference, pp. 276–277, 425, Chi-Yuan Chin et al.

Conference Proceedings, 1985, International Symposium on Computer Architecture, pp. 108–115, Beetem et al.

*Primary Examiner*—Douglas W. Olms
*Assistant Examiner*—H. Kizou
*Attorney, Agent, or Firm*—Michael Melton; B. Peter Barndt; Richard Donaldson

[57] ABSTRACT

A digital crossbar switch designed to facilitate easy and flexible interconnection of up to 8 data ports. The device includes 8 bidirectional ports, each 8 bit wide. Interconnection of the ports is controlled by 32 stored control memory locations associated with each port. The controlling memory locations can be changed dynamically without interfering with data flow. Additional program flexibility can be achieved by providing each port with a 16 word first-in first-out data buffer. The capability to bit reverse the data on any of the ports is also provided to simplify the interconnection of busses from different architectures. The device is fully expandable to wider busses, has extensive test capability and a master reset is provided for system initialization.

13 Claims, 6 Drawing Sheets

PROGRAMMABLE CONFIGURABLE DIGITAL CROSSBAR SWITCH

This application is a Continuation of application Ser. No. 07/764,044, which is a continuation of Ser. No. 07/330,657, filed Sep. 23, 1991 and Nov. 30, 1989, both abandoned.

STATEMENT OF RELATED CASES

This application is related to pending application Ser. No. 065,231 (TI-12227) U.S. Pat. No. 4,852,083, which is assigned to applicants' assignee and the contents of which are herein incorporated by reference.

BACKGROUND OF THE INVENTION

I. Field of the Invention

The present invention relates generally to digital crossbar switches for loading and transferring data from multiple sources to multiple destinations. More particularly, the invention relates to a multiple-port digital crossbar switch that can be dynamically programmed and reprogrammed to load each port.

II. Background of the Invention

Digital crossbar switches require high speed data loading and transmission in order to allow their host computer to solve complex programs such as integrated circuit simulation, global weather predictions, Monte Carlo simulations in solid state particle physics or fault simulation of a nuclear reactor, to name just a few examples. The speed of digital crossbar switches can be related to the manner and method in which the data is received by the individual crossbar ports, stored within the ports, the number of ports and how read from the ports. Most often these and other system parameters are determined by hardwired connections which are physically inadequate for complex computations or lack program flexibility to allow adjustment for dynamically changing problematic conditions. It should thus be apparent that it is desirable to have a digital crossbar switch which is physically hardwired to achieve multiple permutations of data loading and unloading and which also is dynamically reprogrammable to allow changing of routing functions without interrupting data flow.

SUMMARY OF THE INVENTION

Briefly, in one embodiment, the present invention comprises a plurality of multiplexer logic control ports; an m-bit data bus coupled to each of said multiplexer logic ports; a plurality of n-bit input/output data buses, each coupled to a respective one of said multiplexer logic units and to said m-bit internal data bus; a n-bit port-to-port data transfer data bu interconnecting said plurality of multiplexer logic units; and control means associated with each of said individual ports for controlling an interchange of data into and out of said individual ports and between said individual ports.

BRIEF DESCRIPTION OF THE DRAWINGS

Further features, advantages and embodiments of the invention will become more apparent from the following and more particular description of the various embodiments, as illustrated in the accompanying drawings, wherein.

DETAILED DESCRIPTION OF THE PREFERRED EMBODIMENTS

Figure 1:
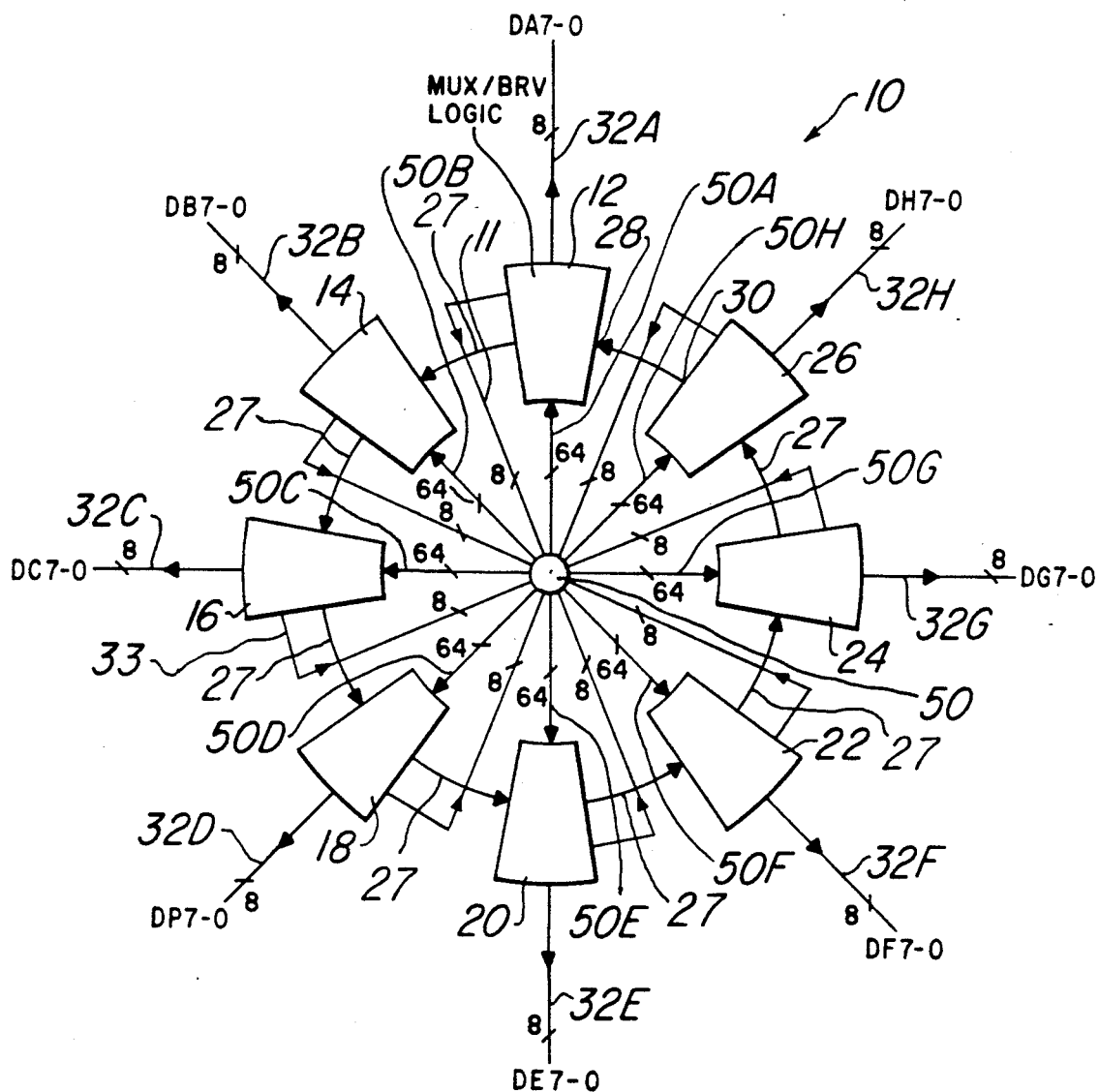
FIG. 1 is a simplified functional block diagram of the invention.

Referring now to the drawing figures, wherein like reference numerals designate like or corresponding parts throughout the several views, FIG. 1 depicts in representative form only a 64 bit digital crossbar switch 10 which has 8 individual multiplexer logics units or control ports 12–26 connected to corresponding sets of 8 bit input out busses 32A–H. Input data can be sent directly to a 64-bit internal or global data bus 50 along 8-bit line 32 and data from global data bus 50 can be received by each logic unit 12–26 along 64-bit lines. Data present in an individual port 12–26 can be serially/sequentially transferred to a lower ordered port port over bus line 27.

Figure 2:
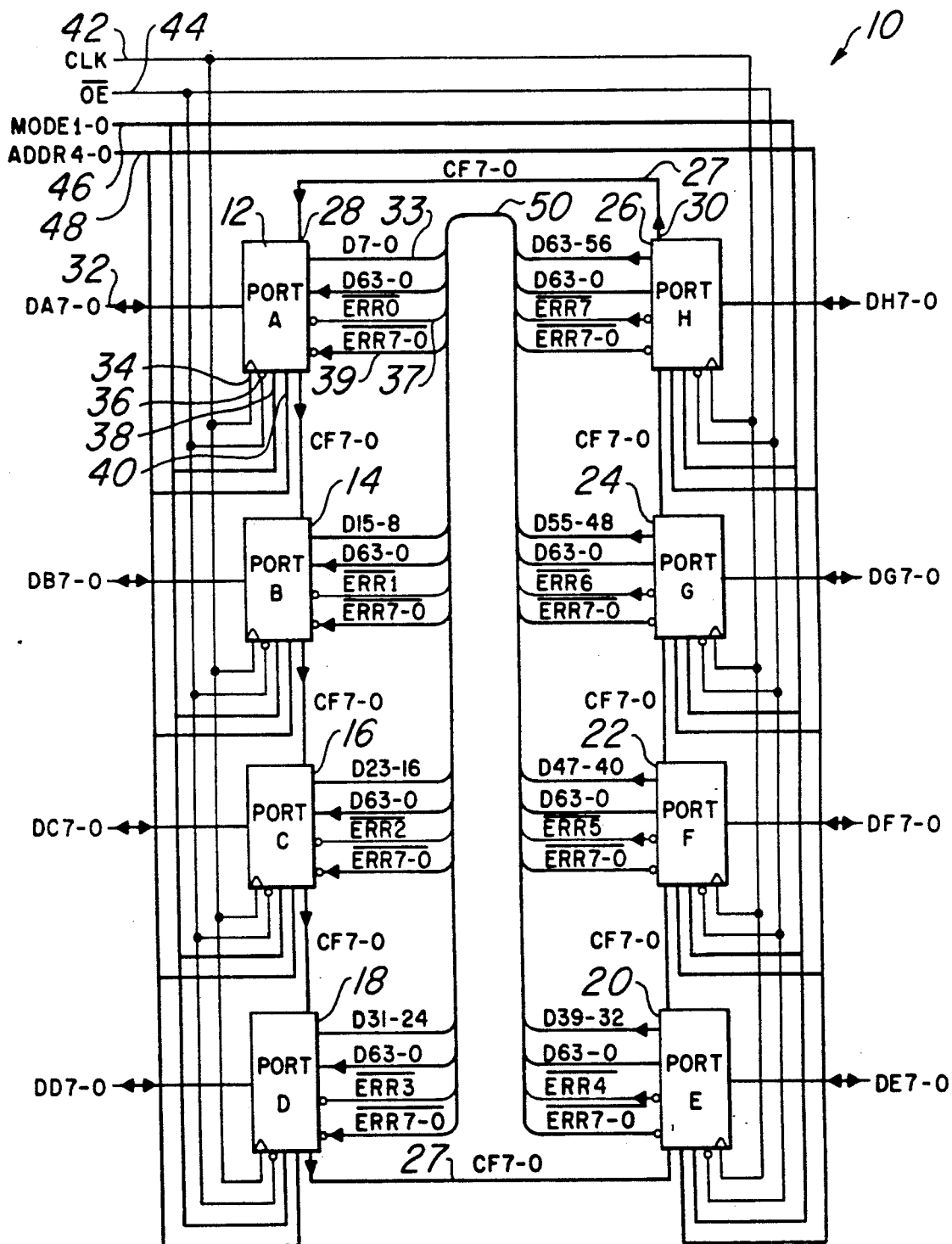
FIG. 2 is a simplified schematic block diagram of the invention.

Referring now to drawing FIG. 2 there is depicted a simplified schematic block diagram of the present digital crossbar switch. As depicted crossbar switch 10 may comprise in a preferred embodiment eight control ports 12–26 (also labeled A–H). Each control port has an eight bit external input/output data bus 32 associated therewith for the interchange of data between the control port 12 and external systems. The control ports 32 are serially connected together via 8 bit internal configuration memory data bus 27. Data bus 27 connects a port output 30 with port input 32 of an adjacent lower designated control port. In the preferred embodiment port B is considered lower than port A; port C lower than port B and so on. However in order to program circular shifting Port A is considered lower than port H.

Crossbar switch 10 also includes a 64 bit global data bus 50 which connects together a plurality of internal data ports associated with each of the individual control ports. Processed 8 bit data which was presented to the external I/O data bus can be transferred to the global bus along bus line 33. Bus lines 37 and 39 are for error signals which indicate whether an error has occurred in a data transmission sequence. The specifics of this will be discussed in more detail hereinafter. Addressing and clocking data is transmitted to control port inputs via respective input lines 42–48.

Figure 3:
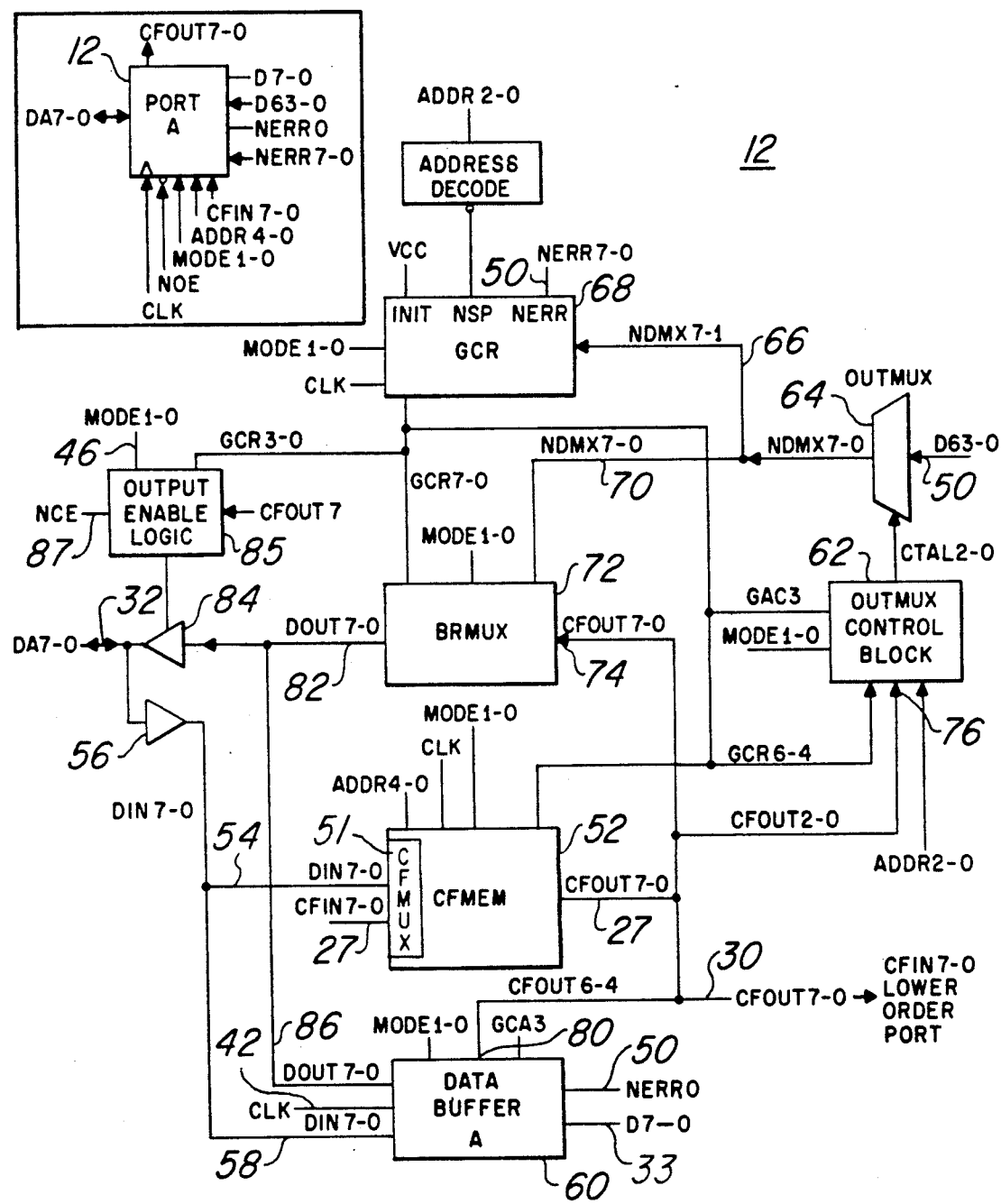
FIG. 3 is a simplified block architecture diagram of an individual control port of the invention.

Referring now to drawing FIG. 3 there is depicted in block diagram form, logic architecture of an individual port, such as port 12. As shown in FIG. 2, an external data byte (DA7-0) may be input on I/O bus 32 to the device port, where it then becomes internal data byte (DIN7-0). This byte then can be loaded under control of input driver 56 to either first in first out data buffer 60 or a configuration memory (CFMEM) 52. The CFMEM 52 is used to route data within the device. An additional path for DIN7-0 leads to the global control register (GCR) 68. The GCR is used to communicate a number of items, including which control port is a Supervisor port, and whether there exists an under/overflow within a data buffer. To get to GCR 68, DIN7-0 passes through data buffer 60 and is presented as buffer data signal D7-0 which becomes one byte of the 64-bit internal global bus 50. D7-0 can then be selected by output multiplexer (OUTMUX) 64 and then loaded into GCR 68 by way of NDMX7-1 path 66.

The source of control port output data byte (DOUT7-0) is the bit-reverse multiplexer (BRMUX) 72, which passes either a byte from the GCR (GCR7-0), or from OUTMUX (NDMX7-0), or from the CFMEM (CFOUT7-0). IF NDMX7-0 is selected for input to BRMUX 72, then there exists an option to bit-reverse the byte before outputting it as DOUB7-0. DOUB7-0 is also available to the data buffer before being provided to I/O bus 32 by output driver 84. When the respective input or output drivers are enabled, DOUB7-0 data will be output from the device and/or reinputted to the device as DIN7-0 data.

As mentioned hereinbefore, D7-0 output of data buffer 60 is provided to 64-bit internal global data bus 50. Each control port 12-26 provides one byte to the internal global data bus, thus the eight ports contribute eight bytes to the internal global bus. OUTMUX 64 selects one byte from this bus for input to the port, where the selected byte becomes NDMX7-0.

Data bus 27 links configuration memories 52 of the control ports in a sequential fashion. For example, CFOUT7-0 in port A is tied to CFIN7-0 in port B; this pattern holds true for the entire crossbar switch. As previously discussed, CFOUT7-0 for port H is tied to CFIN7-0 in port A. In this way control settings written to the configuration memories may be shifted from port to port.

Three select lines (CTRL2-0) of the OUTMUX control logic block 62 select one of the 8 bytes from internal data bus 50 or input to the port. The OUTMUX control block 62 has three sets of select lines from which to choose CTRL2-0. The three sets are: ADDR2-0 (external address lines), CFOUT2-0 (three bits within a memory location of the configuration memory), and GCR6-4 (three bits within the global control register). The OUTMUX control block 62 makes its selection based on three signals, which are: MODE 1, MODE0 and bit 3 of the Global Control Register. Table 1 illustrates the four control modes which may be controlled by the user.

TABLE 1

| MODE1 | MODE0 | Function |
|---|---|---|
| 0 | 0 | Reset data buffer counters and global control registers. |
| 0 | 1 | Normal crossbar operation when not in test mode, read the data buffer counter in the test mode (if GCR3 is high, MODE1 is low and MODE0 is high, then the device will operate in test mode). |
| 1 | 0 | Set a communication path between all eight external data ports or supervisory port and the configuration memory. |
| 1 | 1 | Normal Set a communication path between the new supervisory port (pointed to by ADDR) and the global control registers. |

As mentioned each port has an internal global control register (GCR) 68 which sets routing configurations and aids in testing the present crossbar switch. These control registers are loaded through a designated supervisory port.

MODE OPERATION SPECIFICS

Reset Mode, Mode1=0 Mode0=1

When the reset mode is enabled, all of the bits in the global control registers 68 and the pointers to the data buffers 60 are set to a logic value of zero. The exception is the SP (supervisor port) bit in the control register in the A port, which is set high when the CLK pin undergoes a low-to-high transition on its input line. This operation should be invoked when the system is powered up or after a catastrophic system error. At this point all eight data buffers 60 will appear to be empty. The supervisory port will be port A.

Normal Operation Mode, Mode1=Mode0=1

In normal operation mode, the crossbar routes data between ports in buffered or unbuffered mode. The data buffers are used in buffered mode, but are bypassed in unbuffered mode. The configuration of the routing permutation as well as the global control register parameter must have been previously set. Loading of these sections is discussed in detail in the configuration mode section presented hereinafter. In the normal mode, the global control register and the configuration memories cannot be updated by the user. When a clock pulse is applied during normal operation, the address in the GCR (GCR6-4) will be incremented. This address is used during test mode (GCR3 set high) to point to one of the eight data buffer pointers/counters. In test mode, the selected data buffer pointer/counter can be output from the device. When bit 3 of the GCR (TST bit) is set, the device will operate in test mode if MODE1=0 and MODE0=1. In the normal mode, the data buffer memories may be loaded, unloaded, held (no loading or unloading) or bypassed.

Configuration Mode, Mode1=1 Mode0=0

The configuration memories can be loaded or read in this mode through various means. Two bits in the global control register (CFLD1,CFLD0) determine which one of three loading/reading schemes will prevail. The memories may be loaded in parallel through their individual corresponding data ports, or they may be loaded serially through the supervisory port (requires multiple clocks—the number of clocks depends on how many memories are to be loaded), or each configuration memory may be set up to receive data from a lower (lettered) configuration memory while it simultaneously transmits data to a higher memory. Port H is considered to be the port lower than port A in this case), thereby simulating a set of recirculating shift registers. Loading of the configuration memories is synchronized with the low to high transition of the CLK input. The address pins point to eight locations, one in each of the 8 memory banks.

During this mode, the data buffer memories and the global control memory cannot be updated. In this mode, output enable logic (OE) 85 overrides the internal logic, and so the configuration memories may be read by pulling the external output enable 87 low under any of the four configurations. Under three of these configurations, reading the memories will also enable writeback to the same memory location, if clocked. The mapping of these bits, CFLD1 and CFLD0, are set forth in Table 2 (see the GLOBAL CONTROL REGISTERS SECTION):

TABLE 2

| CFLD1 | CFLD0 | OE | FUNCTION |
|---|---|---|---|
| 0 | 0 | 0 | Read the word in the supervisory port addressed by ADDR, serially shift the configuration memories, copy back (second copy) word read (dangerous mode). This mode is dangerous because the contents of a configuration memory location within one of the ports will be lost. As an example, assume port A is the supervisor: DA7-0 <-- port A CFMEM; port B CFMEM <-- port A CFMEM; port C CFMEM <-- port B CFMEM; . . . ; port H CFMEM <-- port G CFMEM port A CFMEM <-- DA7-0 (port A CFMEM); This results in the original port H contents being lost. |
| 0 | 0 | 1 | Load the configuration memory pointed to by ADDR in the supervisory port and shift all other words addressed by ADDR in the other ports - All outputs are in high-impedance state. |
| 0 | 1 | 0 | Parallel read the 8 configuration memory locations pointed to by ADDR, an enable writeback. |
| 0 | 1 | 1 | Parallel load the 8 configuration memory locations pointed to by ADDR - All outputs are in a high-impedance state. |
| 1 | 0 | 0 | Parallel read the 8 configuration memory locations pointed to by ADDR, an disable writeback. |
| 1 | 0 | 1 | All outputs are in a high-impedance state - Disable loading. |
| 1 | 1 | 0 | Serially Shift and read the configuration memories through the supervisory port - All other ports are in a high-impedance state. |
| 1 | 1 | 1 | Serially shift the configuration memories - All outputs are in a high-impedance state. |

Global Control Mode Mode1=1 Mode0=1

The last mode allows the user to load or read the global control registers. In this mode the configuration memories and the data buffer memories are held. During a load operation, the common address lines (ADDR2-0) must point to the address of the supervisory port and control data must be placed on this port before the low to high transition of the clock. The control data is loaded into all 8 global control registers, with the exception of the supervisory port (SP) bit, which will be discussed in more detail hereinafter. During the read operation, each port will contain the contents of its global control register. Also, during the read operation the clock should be turned off (unless the data is to be written back to the GCR).

The device control settings are stored internally in the configuration memories (CFMEM) associated with each port and in the global control registers (GCR). The configuration settings of the eight port logic groups are selected by the address inputs ADDR4-0, which specify one of the 32 locations in each of the configuration memories. Other control signals are stored in the global control registers which are accessed by means of the mode control signals MODE 1-0.

Configuration control for setting the routing permutations and control of the data buffer can be initialized through individual data ports when each external system processor demands its own source of information, or from a common port where the whole system is to be configured by one supervisor. For diagnostic purposes, the configuration memory locations may be read out of the chip from each individual port or from a common supervisor bus. Only one port may be designated as the supervisor; however, the supervisory port may be changed dynamically. On initialization, port A is designated as the supervisor port during a reset.

Test capability is provided by the GCR. If the test bit within the GCR has been set, and if the mode control signals have been set appropriately, then a selected pointer to a data buffer may be read out of the device. This one pointer will be available to all eight ports. By changing the selection, any or all of the pointers may be read out of the device.

A master reset capability is provided for system initialization, placing port A in the supervisory mode.

The data buffers emulate a First-in First-out (FIFO) data memory. In contrast to many FIFO devices, loading and unloading operations are synchronized to the same rising clock edge. Though the output rate does not have to equal the input rate, they are both tied to the clock rate. The valid data buffer operations are: load, unload, bypass, hold and load/unload.

Each data buffer is controlled by a 5-bit counter which points to one of the sixteen available words when the data memory has not been completely filled or emptied, and points to a nonexistent word when too many pushes or pops have occurred. If any of the data buffers underflows or overflows, the ERR bit in each of the 8 global control registers is set. As will be explained later, the global control control registers can be read through any port, thus the user can detect when an underflow/overflow has occurred. Once such a condition has been identified, the value of the pointer allows the user to determine how many pieces of data may have been lost.

Port Architecture

As previously mentioned, there are six basic blocks within each port of FIG. 3: the output multiplexer (OUTMUX) 64, the output enable logic 85, global control register (GCR) 68, bit reverse multiplexer (BRMUX) 72, configuration memory (CFMEM) 52 and the data buffer 60.

Data Buffers

Each of the eight ports contains a 16-word data buffer whose operation is controlled by 3 of the 8 data bits in a configuration memory word CFOUT 6-4. The locations in the data buffer are numbered 15 through 0, with location 0 providing DBOUT7-0 to the bus selector 84. DBOUT7-0 always has the value in data buffer location 0 The data buffer pointer/counter (DBP) will point to the first empty location in the data buffer. The DBP consists of the COUNTER4-0 bits, where COUNTER4 is the most significant bit. COUNTER5 is set high if an operation results in an underflow condition. If the data buffer underflows, then the DBP will point to location 0. COUNTER6 is set high if an operation results in an overflow condition. If the data buffer overflows, then the DBP will point to location 15. COUNTER7 is always low (tied to ground internally). Table 3 lists the contents of the COUNTER byte.

TABLE 3

| COUNTER bit | Contents |
|---|---|
| 7 | Ground |

TABLE 3-continued

| COUNTER bit | Contents |
| --- | --- |
| 6 | Overflow Flag |
| 5 | Underflow Flag |
| 4-0 | DBP4-0 (DBP4 is the most significant bit) |

During test mode (GCR3 high MODE1 low and MODE0 high) the COUNTER byte may be read out of the port. This provides the user with the counter value, and also indicates whether there has been an underflow or overflow of the data buffer.

Data may be loaded from either the external data byte (DIN7-0) associated with the data buffer memory or an internal data byte (DOUT7-0) which corresponds to the data byte pointed to by the control for the output multiplexer of this port. The internal bus may be different from the external bus if the port is in a high impedance mode.

Table 4 covers the nine outputs of the buffer control block.

TABLE 4

| Signal | Function |
| --- | --- |
| RST | Reset the data buffer pointer/counter (DBP) to zero. |
| DOWN | Decrement the DBP. |
| UPLD | Load the data buffer location pointed to by DBP, and then increment the DBP. |
| LDULD | Unload buffer zero, then ripple the buffers at locations DBP −1 through one. This will result in buffers DBP −2 through zero having the rippled data. Next, the new data is loaded into the buffer at location DBP −1 |
| RIPPLE | Shift the data buffers one position, used for unloading operation. |
| SELDOUT | When loading the data buffer, will select DOUT7-0 when high, and will select DIN7-0 when low. The selected byte will then be provided to the data buffer as DBIN7-0. |
| FC | Causes the bus selector to select COUNTER7-0 (Counter). |
| DB | Causes the bus selector to select DBOUT7-0 (Data buffer). |
| FT | Causes the bus selector to select DIN7-0 (External data). |

Table 5 illustrates what happens to the data buffer and to the DBP during a load, unload or load/unload operation. The DBP is updated after the data buffer has been operated on, not before. In the table, "BufN" indicates the N'th location within the data buffer. The input to the data buffer is DBIN7-0. It should be noted that not until after the clock is applied during an unload or load/unload operation will the contents of DBOUT7-0 change from the old Buf(0) value to the new Buf(0) value. As an example:

| DBOUT7-0 | BUF(0) | BUF(1) | CLK(1) | Unload Operation |
| --- | --- | --- | --- | --- |
| valueY | valueY | valueZ | 0 | 0 |
| valueY | valueY | valueZ | 0 | 1 |
| valueZ | valueY | — | 1 | 1 |

All data buffer operations are synchronized to the low-to-high transition of the CLK input. Each data buffer has two flags associated with it, overflow and underflow, which indicate that too many loads or unloads have occurred. The ERR bit in the global control register is the logical OR of the two flags. By interrogating the pointer to the data buffer, the user may determine how much data may have been lost.

TABLE 5

| DBP | LOAD<br>DBP <-- DBP +1<br>after operation | UNLOAD<br>DBP <-- DBP −1<br>after operation | LOAD AND UNLOAD<br>DBP unchanged |
| --- | --- | --- | --- |
| 0 | Buf0 <-- DBIN7-0 | underflow flag set | Contents of DBIN7-0 are lost, loaded to a nonexistent location, underflow flag not set |
| 1 | Buf1 <-- DBIN7-0 | no ripple<br>DBOUT7-0 <-- Buf0 | DBOUT7-0 <-- Buf0<br>Buf0 <-- DBIN7-0 |
| 2 | Buf2 <-- DBIN7-0 | DBOUT7-0 <-- Buf0<br>Buf0 <-- Buf1 | DBOUT7-0 <-- Buf0<br>Buf0 <-- Buf1<br>Buf1 <-- DBIN7-0 |
| 3 | Buf3 <-- DBIN7-0 | DBOUT7-0 <-- Buf0<br>Buf0 <-- Buf1<br>Buf1 <-- Buf2 | DBOUT7-0 <-- Buf0<br>Buf0 <-- Buf1<br>Buf1 <-- Buf2<br>Buf2 <-- DBIN7-0 |
| 4 | Buf4 <-- DBIN7-0 | DBOUT7-0 <-- Buf0<br>Buf0 <-- Buf1<br>Buf1 <-- Buf2<br>Buf2 <-- Buf3 | DBOUT7-0 <-- Buf0<br>Buf0 <-- Buf1<br>Buf1 <-- Buf2<br>Buf2 <-- Buf3<br>Buf3 <-- DBIN7-0 |
| . | . | | |
| 15 | Buf15 <-- DBIN7-0 | DBOUT7-0 <-- Buf0<br>Buf0 <-- Buf1<br>Buf1 <-- Buf2<br>.<br>.<br>Buf12 <-- Buf13<br>Buf13 <-- Buf14 | DBOUT7-0 <-- Buf0<br>Buf0 <-- Buf1<br>Buf1 <-- Buf2<br>.<br>.<br>Buf12 <-- Buf13<br>Buf13 <-- Buf14<br>Buf14 <-- DBIN7-0 |
| 16 | overflow flag set | DBOUT7-0 <-- Buf0<br>Buf0 <-- Buf1<br>Buf1 <-- Buf2 | DBOUT7-0 <-- Buf0<br>Buf0 <-- Buf1<br>Buf1 <-- Buf2 |

TABLE 5-continued

| LOAD DBP ← DBP +1 DBP after operation | UNLOAD DBP ← DBP −1 after operation | LOAD AND UNLOAD DBP unchanged |
|---|---|---|
| | Buf13 ← Buf14 Buf14 ← Buf15 | Buf13 ← Buf14 Buf14 ← Buf15 Buf15 ← DBIN7-0 |

Table 6 sets forth the eight functions of the data buffer in the normal operation mode.

TABLE 6

| $F_2$ | $F_1$ | $F_0$ | |
|---|---|---|---|
| 0 | 0 | 0 | Reset individual DBP |
| 0 | 0 | 1 | Select DIN7-0, bypass data buffer |
| 0 | 1 | 0 | Unload data buffer, select DBOUT7-0 |
| 0 | 1 | 1 | Select DBOUT7-0, hold data buffer load external data (DIN7-0). |
| 1 | 0 | 0 | Load external data (DIN7-0), unload data buffer, select DBOUT7-0 |
| 1 | 0 | 1 | Load external data, select DBOUT7-0 |
| 1 | 1 | 0 | Load internal data (DOUT7-0), unload data buffer, select DBOUT7-0 |
| 1 | 1 | 1 | Load internal data, select DBOUT7-0 |

Configuration Memory

Each of the eight ports contains a 32-word by 8-bit memory bank which controls the actions of the data buffer and the output multiplexer associated with this port. All eight of these memories are addressed by a common 5-bit address bus. Loading and unloading of these memories has already been discussed hereinbefore. Besides containing the data buffer control bits (F2-0) and the multiplexer address bits (S2-0), the word contains an output enable control (CFOE) which in conjunction with the external output enable pin allows the port to become an active output, and a bit reverse control (BRV) which bit reverses the data before it exits the chip.

In the reset, normal and global control register modes, the contents of the configuration memories are not affected.

The bit mapping for the configuration memory is listed in Table 7.

TABLE 7

| Configuration Memory bit | Function |
|---|---|
| 7 | CFOE - AND'd with OE to enable or disable a port's output |
| 6 | F2 - data buffer instruction bit (MSB) |
| 5 | F1 - data buffer instruction bit |
| 4 | F0 - data buffer instruction bit (LSB) |
| 3 | BRV - if high, selects bit reverse function in BRMUX |
| 2 | S2 - OUTMUX select line (MSB) |
| 1 | S1 - OUTMUX select line |
| 0 | S0 - OUTMUX select line (LSB) |

Global Control Registers

The global control registers are 8-bit registers which can be loaded through the port which will become the supervisory port, or may be read through any port. The most significant bit (ERR) signals that one or more of the data buffer memories has been loaded or unloaded too many times. The next three bits (GCR6-4) replace the OUTMUX select bits S2-0 in the test mode; in this mode the data buffer pointer, underflow flag and overflow flag associated with the port addressed by GCR6-4 can be read. When the GCR is loaded, the three address bits (GCR6-4) are placed in a counter. When MODE1 is low and MODE0 is high, the counter will increment whenever a clock is applied to the device. In this way, the data buffer pointers may be read out in sequence (during test mode) without the user having to reload the GCR with the address of the next port. Once the counter reaches the value of seven, it will reset to zero. The next bit (TST) tells the device to go into the internal test mode, where the data buffer pointers may be read out. The next two bits (CFLD1 -CFLD0) control the method for loading/reading the configuration memory. The last bit (SP) indicates that a given port is the supervisory port.

After a global reset (MODE1=MODE0=0), the SP bit is set high (VCC) in port A and reset (GND) in all of the other ports. As depicted in FIG. 3, the INIT input to the GCR is tied to VCC; this sets the SP bit in port A. For the other ports, the INIT pin is tied to ground, thus clearing the SP bit during a global reset. In global control mode (MODE1=MODE0=1), the control data can be loaded into the supervisory port, but the SP bit in the supervisory port's global control register is set, and the SP bit in the other global control registers is cleared. With the exception of the SP bit, the contents of all eight GCR's are the same. Global control mode is also used to change the supervisory port. The user simply places an address on the ADDR2-0 lines which points to the port which is to become the supervisory port. An ADDR value of 0 (ADDR2-0=000) corresponds to port A and an ADDR value of 7 (ADDR2-0=111) points to port H.

In the normal mode only the ERR bit and GCR 6-4 bits are affected. In the configuration mode none of the bits in the GCR The bit mapping of the GCR registers are set forth in table 8:

TABLE 8

| Bit | Function |
|---|---|
| 7 | ERR - if high, indicates that an underflow or overflow in one or more of the data buffers has occurred |
| 6 | GCR6 - OUTMUX select line in TEST mode (MSB) |
| 5 | GCR5 - OUTMUX select line in TEST mode |
| 4 | GCR4 - OUTMUX select line in TEST mode (LSB) |
| 3 | TST - if high, and if MODE1 is low and MODE0 is high, then directs device to operate in TEST mode |
| 2 | CFLD1 - controls method of loading/reading the configuration memory |
| 1 | CFLD0 - controls method of loading/reading the configuration memory |
| 0 | SP - if high, indicates that this port is the Supervisor |

Outmux

The output multiplexer (OUTMUX) selects one of the eight bytes of data from the 64-bit internal data bus. CTRL2-0 are used by OUTMUX to make the selection.

CTRL2-0 are output from the OUTMUX control block, which uses GCR3 (TST), MODE1 and MODE0 to decide which one of three pointers will become CTRL2-0. The three sets of pointers available to the OUTMUX control block are: S2-0 (CFOUT2-0), GCR6-4 and ADDR2-0. Under different modes, different pointers may be used to select which of these bytes is passed to the BRMUX. The modes set forth in Table 9 are available:

TABLE 9

| MODE1 | MODE0 | TST | Mode Selected | Pointer Used (CRTL2-0) |
|---|---|---|---|---|
| 0 | 0 | X | Reset | X |
| 0 | 1 | 0 | Normal Operation | S2-0 (CFOUT2-0) |
| 0 | 1 | 1 | Test | GCR6-4 |
| 1 | 0 | X | Configuration | X |
| 1 | 1 | X | Global Control | ADDR2-0 (Address of Supervisory port) |

| CRTL2-0 | | | Data received from port |
|---|---|---|---|
| 0 | 0 | 0 | A (D7-0) |
| 0 | 0 | 1 | B (D15-8) |
| 0 | 1 | 0 | C (D23-16) |
| 0 | 1 | 1 | D (D31-24) |
| 1 | 0 | 0 | E (D39-32) |
| 1 | 0 | 1 | F (D47-40) |
| 1 | 1 | 0 | G (D55-48) |
| 1 | 1 | 1 | H (D63-56) |

Bit Reverse Mux-Brmux

The bit reverse multiplexer sends data to the output gate. Its truth table follows in Table 10.

TABLE 10

| MODE1 | MODE0 | BRV | OE | External Data (i.e. DA7-0) |
|---|---|---|---|---|
| 0 | 0 | X | X | Not specified (chip output is high-impedance) |
| 0 | 1 | 0 | 0 | The selected internal data byte is passed |
| 0 | 1 | 1 | 0 | The selected internal data byte is bit reversed and passed |
| 1 | 0 | X | 0 | The address configuration memory word is passed |
| 1 | 1 | X | 0 | The global control register is passed |

Output Control

The output drivers for a given port will become active under one of two conditions. The first occurs when MODE1 is low, MODE0 is high, OE is low, and the corresponding internal CFOE has ben set to a one. The second condition places the output drivers (of all the ports) active when MODE1 is high and OE is low. These two conditions are listed in Table 11.

TABLE 11

| MODE1 | MODE0 | OE | CFOE | Operating mode |
|---|---|---|---|---|
| 0 | 1 | 0 | 1 | Normal |
| 1 | X | 0 | X | Configuration or Global Control |

The exception to the second condition is when the device is serially shifting and reading the configuration memories through the supervisory port; in this case only the output drivers for the supervisory port are active, the output drivers for the other ports are disabled. This exception condition occurs when MODE1 is high, MODE0 is low, CFLD1 and CFLD0 are high, and OE is low. The exception is listed in Table 12.

TABLE 12

| MODE1 | MODE0 | CFLD1 | CFLD0 | OE | Operating mode |
|---|---|---|---|---|---|
| 1 | 0 | 1 | 1 | 0 | Configuration |

Example

The following example illustrates how to program the device to broadcast a byte. In particular, Port A will be configured as an input, and the data presented to Port A will be broadcast to the remaining ports. The example assumes that it is necessary to reset the device, as shown in the first operation performed.

To program the device three steps are required: reset, load the GCR and then load the CFMEM. CFMEM location zero will be used to store the broadcast configuration. After these three steps have been performed the device is ready to broadcast the data at port A. It should be emphasized that the actual broadcasting is done asynchronously, so no CLK signal is required. In the following tables a CLK value of '1' indicates that the signal undergoes a low-to-high transition.

| Step One -- Reset the device | | | | | |
|---|---|---|---|---|---|
| MODE1 | MODE0 | OE | ADDR4-0 | CLK | DA7-0 |
| 0 | 0 | X | XXXXX | _- | X |

This step performs the following:
All bits within each GCR and DBP are cleared (GND). The exception is GRC0 (SP bit) in Port A, which is set (VCC). Setting the SP bit identifies Port A as the supervisory port.

| Step two -- Load the Global Control Registers | | | | | |
|---|---|---|---|---|---|
| MODE1 | MODE0 | OE | ADDR4-0 | CLK | DA7-0 |
| 1 | 1 | 1 | XX000 | _- | 0XXX001X |

This step performs the following:
The GCR in Port A (the supervisory port) is loaded with the data on DA7-0. ADDR2-0 is used to point to the supervisory port. The data loaded into the GCR perform the following:

| GCR bit | Function | Value | Indicates |
|---|---|---|---|
| 7 | ERR | 0 | No error |
| 6-4 | OUTMUX select | XXX | Not applicable (only used in Test mode) |
| 3 | TST | 0 | Device will not be used in Test mode |
| 2-1 | CFLD1-0 | 01 | Parallel load CFMEM from each port |
| 0 | SP | X | Never used |

| Step three -- Load CFMEM location zero | | | | | |
|---|---|---|---|---|---|
| MODE1 | MODE0 | OE | ADDR4-0 | CLK | DA7-0 DB7-0 through DH7-0 |
| 1 | 0 | 1 | 00000 | _- | 10010000 |

This step performs the following actions
CFLD1-0 bits indicate a parallel load of the eight configuration memories pointed to by ADDR4-0. Since the ADDR4-0 bits are all low, location zero of the CFMEM will be loaded. The data at each port will be loaded into the respective CFMEM location. The data loaded into Port A's CFMEM location perform the following:

| CFMEM location zero | Function | Value | Indicates |
|---|---|---|---|
| 7 | CFOE | 0 | Port A is an input |
| 6–4 | F2-0 | 001 | In data buffer; select external data and bypass data buffer memory |
| 3 | BRV | X | Not applicable since Port A is functioning as an input |
| 2–0 | OUTMUX select | XXX | |

The data loaded into the other port's CFMEM location zero perform the following:

| CFMEM location zero | Function | Value | Indicates |
|---|---|---|---|
| 7 | CFOE | 1 | Port B through Port H are outputs |
| 6–4 | F2-0 | 001 | In data buffer; select external data and bypass data buffer memory. |
| 3 | BRV | 0 | Don't bit-reverse the data leaving the BRMUX |
| 2–0 | OUTMUX select | 000 | Select D7-0 of the internal data bus for output. D7-0 is the data corresponding to Port A. |

The data buffers within Ports B through H are not pertinent to this operation, however by coding the F2-0 bits to perform a bypass, the user is ensured that the buffers are not inadvertently corrupted.

For the device to perform the broadcast function, the following signal levels are needed:

| MODE1 | MODE0 | OE | ADDR4-0 |
|---|---|---|---|
| 0 | 1 | 0 | 00000 |

The mode control lines instruct the device to operate in the normal mode. The address lines instruct the device to use the configuration control provided by CFMEM location zero. The output enable line allows Ports B through H to become active outputs. Again, the CLK signal is not used to perform the broadcast function.

In summary, the three steps to set up the broadcast are:

| MODE1 | MODE0 | OE | ADDR4-0 | CLK | DA7-0 | DB7-0 through DH7-0 |
|---|---|---|---|---|---|---|
| 0 | 0 | X | XXXXX | _- | XXXXXXXX | XXXXXXXX |
| 1 | 1 | 1 | XX000 | _- | 0XXX001X | XXXXXXXX |
| 1 | 0 | 1 | 00000 | _- | 0001XXXX | 10010000 |

Application Information

Connection to a Data Bus through a Transceiver

Figure 4:
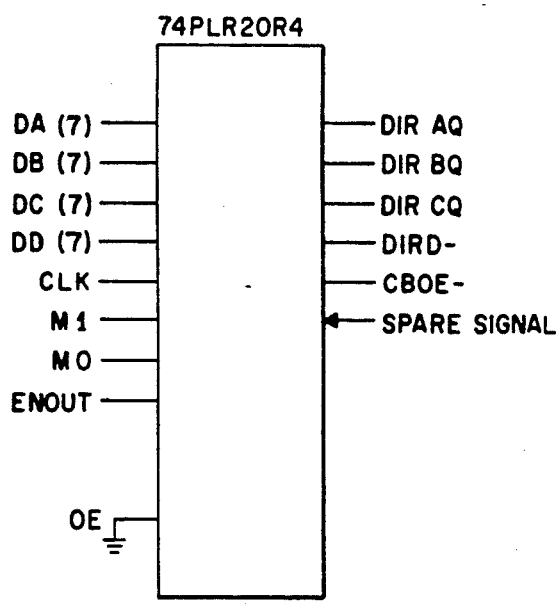
FIG. 4 is a schematic block diagram depicting an application of the invention.
Figure 5:
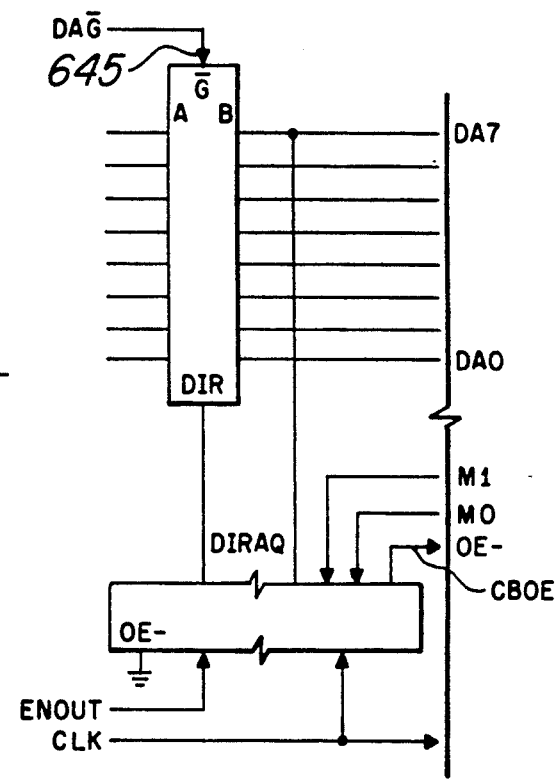
FIG. 5 is a schematic block diagram depicting a port connection for the FIG. 4 application.

The present crossbar switch (device) is not designed to heavily loaded buses. Since the configuration of the device is buried within the chip, a method for determining whether each port is receiving or transmitting data must be developed. Remembering that the configuration memory may be interrogated, we may develop a scenario to store the CFOE bits from each port which correspond to the configuration which is active. A single 74PLR20R4 PAL will store the CFOE bits for up to 4 device ports. the I/O assignments of the PAL are shown in FIG. 4 and the connection between a single device port and the PAL is shown in FIG. 5. To perform this operation it is suggested that the user sets the CFLD1 bit and resets the CFLD0 bit in the global control registers. This allows all 8 CFOE bits to be read without destroying their contents. The M1 bit should be placed into the high state and the M0 bit should be brought low. When OE- is brought low and the devices are clocked, all eight CFOE bits will be stored in the PAL(s). M1 should be brought low and M0 should be raised high. The part is now in normal operation and the transceivers are set to the proper direction. Data may continue to be transmitted until a new configuration (ADDR is changed) is desired. The process is then repeated to set up the new transceiver controls.

Expanding the Number of Channels

Figure 6:
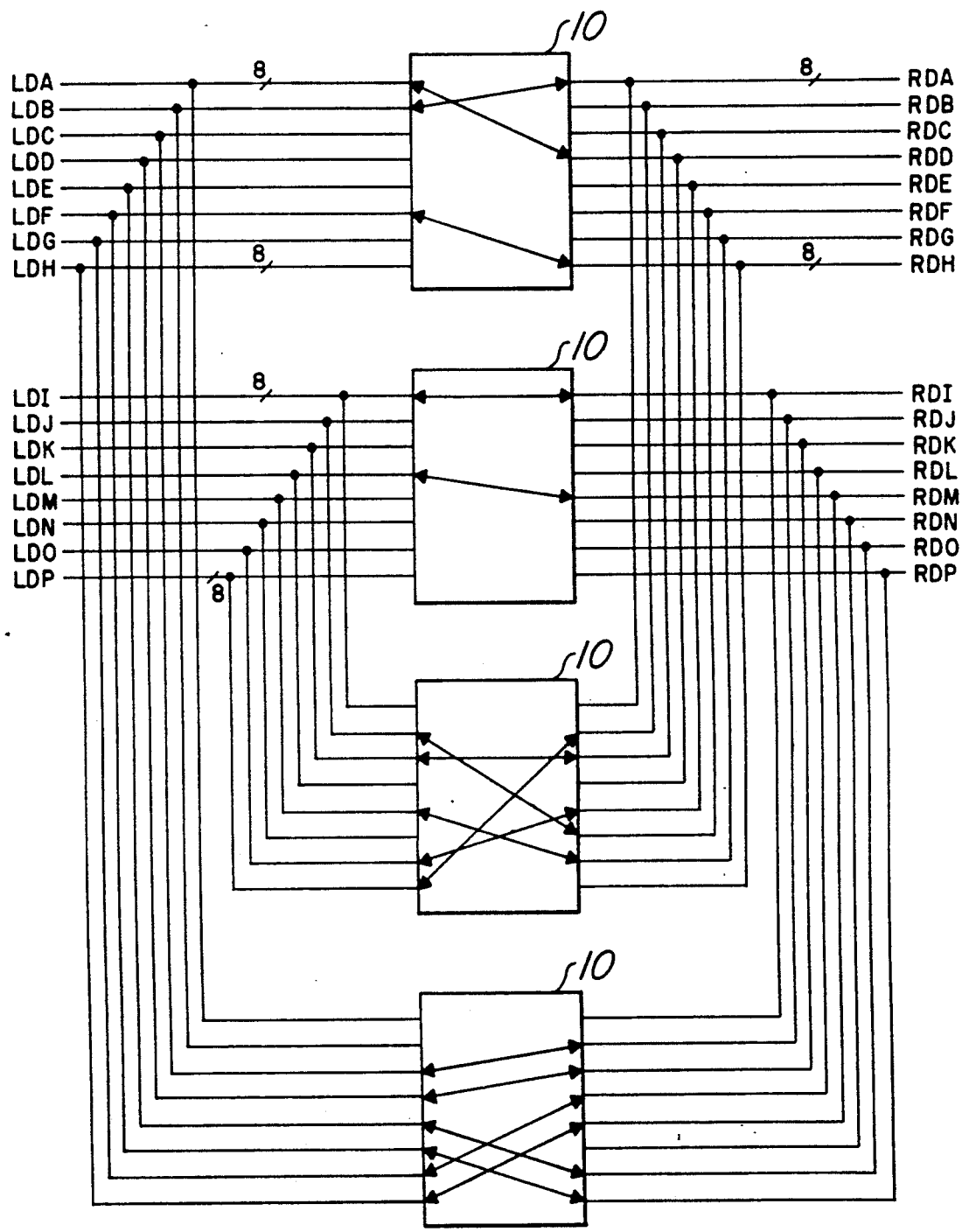
FIG. 6 is a schematic block diagram depicting how multiple devices in accordance with the invention may be interconnected.

The device may be expanded to an 16 by 16 bidirectional nonblocking crossbar by using 4 devices (per 8 byte or each channel). The connection diagram for the 4 8842s is shown in FIG. 6. A single random permutation will illustrate this circuit. Let us choose to connect the 16 left channels labeled LDA-LDP to the 16 right channels labeled RDA-RDP in the following manner:

| LEFT PORT | RIGHT PORT |
|---|---|
| LDB | RDA |
| LDP | RDB |
| LDK | RDC |
| LDA | RDD |
| LDA | RDE |
| LDJ | RDF |
| LDM | RDG |
| LDF | RDH |
| LDI | RDI |
| LDC | RDJ |
| LDD | RDK |
| LDG | RDL |
| LDH | RDM |
| LDL | RDN |
| LDE | RDO |
| LDN | RDP |

Notice that to hook N=8*M ports to N ports in this manner requires M**2 devices. Other routing methods such as hypercubes and delta networks may be employed using less chips. These are usually blocking networks and are harder to describe. One method which would reduce the number of devices would be to use the data buffers to store the data from four sets of routing channels. By using four configuration memory locations to store one routing permutation the four devices may be collapsed into 1 device. Notice however that the data buffering capability, number of routing permutations, and the throughput have all been decreased by a factor of four.

Expanding to the Systems Wordwidth

If it is desired to connect 16-32 bit busses this would require four of the present crossbar switches, each one routing a byte in each of the 16 data channels. All four devices would contain the same configuration controls and global memory values. Suppose that we wanted to connect 4-16 bit channels together. One device could perform this task since the 8 ports could partition into 4 pairs with each pair having common configuration memories. A problem arises, however, since only one 8 bit port may be designated as the supervisor and that serial data transmission will be byte serial instead of word serial. The user must choose either the upper or lower byte to be the location of all control data.

Buffering and Aligning Data Stored on Byte Boundaries

When reading data from memory, we may wish to start reading data on any given byte boundary. Suppose we have two 32 bit busses connected together and we want to start 32 bit quantities starting with the third byte in the first word. We configure one device as a 32 bit bidirectional FIFO. The first word consisting of bytes B3-B0 is loaded into the first buffer word. The second word B7-B4 is loaded into the second buffer word. The buffers containing bytes B0 and B1 are unloaded. The first buffer word now contains B3, B2, B5, B4. A permutation is chosen so that the data comes out as B5, B4, B3, B2. The first buffer word is unloaded and the third data word B11-B8 is loaded. The first buffer word now contains B7, B6, B8, B9 which may be routed as before. The process continues until the desired number of words have been read.

Expanding the Data Buffer Word Size

The device can be reconfigured internally to appear to have more data buffer storage on each port. This is achieved by connecting the output of one data buffer to the input of another data buffer by using the crossbar feature and by feeding internal data to the second data buffer instead of the external data.

Figure 7:
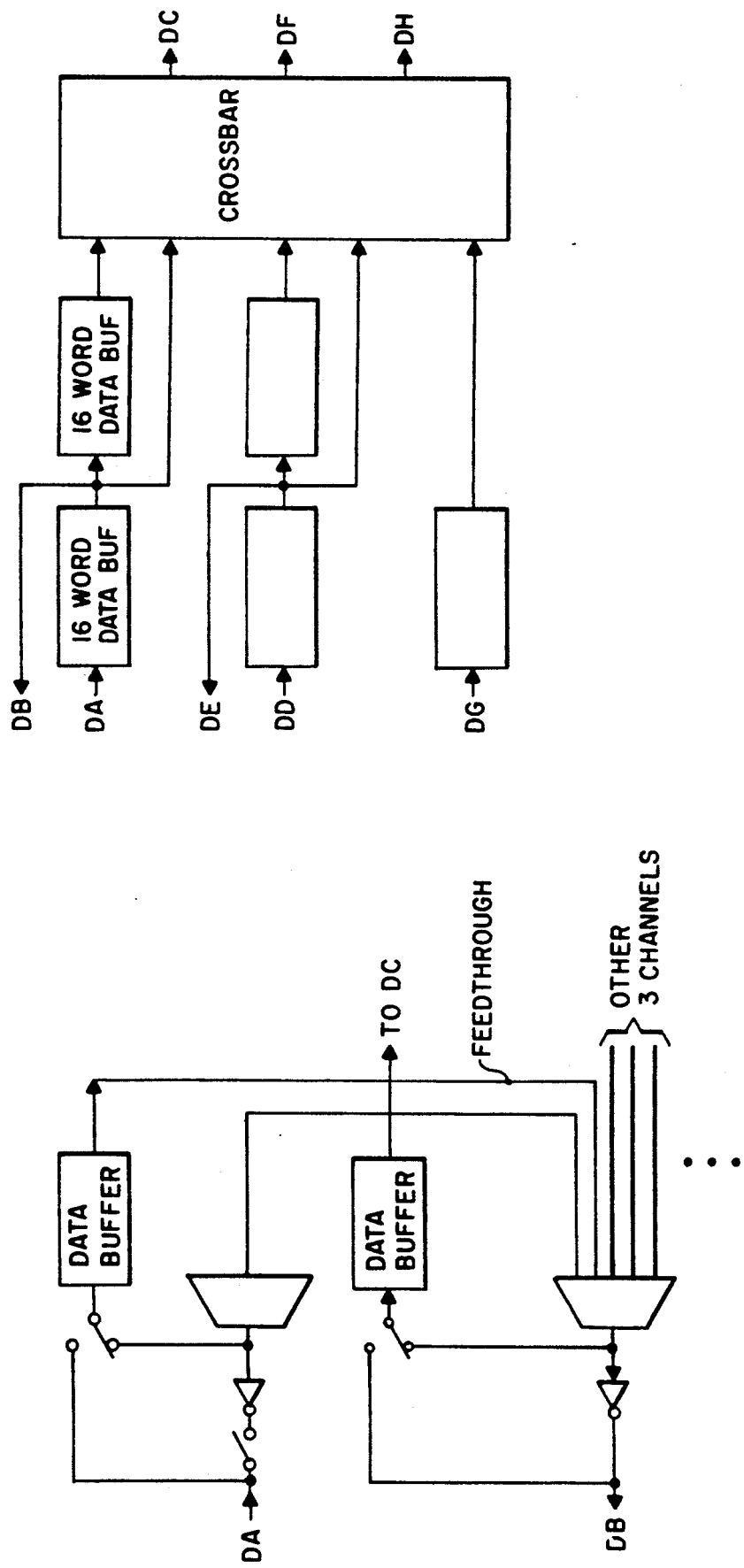
FIG. 7 is a schematic block diagram depicting another embodiment of the invention.

FIG. 7 illustrates a 3 input 5 output crossbar. Note that the DD and DD ports have 32 bits of data storage. The DB output becomes from the 1st 16 words of data storage of the DA port. Data DG is buffered up to 16 levels deep. DC, DF and DH may receive inputs from any of the data buffer sources. DB and DE may be viewed as tapped delay lines.

This configuration may be useful in signal processing applications where data is delayed in operations such as convolution and filtering. The DB port could be used along with for example, the DC port if two different devices with different pipelining levels both required the data on the DA port.

Technical Advantages of the Invention

A technical advantage of the disclosed digital crossbar switch is that it facilitates high speed data transfers between two to eight ports. In the eight port configuration one switch can support eight byte wide (8 bit) processing ports. In the two port configuration, one switch can support data transfer between to 32 bit ports. Additionally the present device can easily be cascaded to handle larger bus systems. For example, 4 of the present switches can connect 8-32 bit busses.

Another technical advantage of the present device is that it can be easily constructed in single package integrated chip fashion. Additionally the device is designed to provide for the maximum amount of data communication with the smallest amount of control overhead. Routing control is provided by 32 stored memory locations on each port within the chip provided up to 32 possible routing permutations. Once stored, these memory locations can be changed dynamically without interrupting the flow of data. Data transfer is simplified by providing a 16 word data buffer on each of the input ports. Connecting dissimilar busses together is eased by the chip's ability to bit reverse data as it flows from one port to another, eliminating the problem which often occurs when on system denotes bit zero as the LSB while another system denotes bit zero as the MSB. This feature can also be used when generating in place FFT address calculations.

Configuration control for setting the routing permutations and control of the data buffer can be initialized through individual data ports, when each processor wishes to demand its own source of information, or from a common port where the whole system is to be configured by one supervisor. The configuration memory locations may be read out of the chip for system diagnostic purposes from each individual port or from a common supervisor bus. Only one port may be designated as the supervisor, however the user may dynamically change the port which is the supervisor when desired. The device initializes such that port A is designated as the supervisor port during a reset.

Test capability is provided via an internal control set of flipflops which may be loaded and read through the supervisory port. The pointers to each data buffer may be read either in parallel out the ports which the data buffer is attached to, or sequentially through the supervisory port.

A master reset capability is provided for system initialization (which places port A into the supervisory mode).

The data buffers emulate a first-in first-out data memory. The memory is not quite as flexible as most FIFO devices. Loading and un-loading operations are synchronized to the same rising clock edge. Though the output rate does not have to equal the input rate, they are both tied to the clock rate. The amount of data which currently resides in each of the 16 data buffers can be interrogated, but only under software control, by reading an embedded status word. Each data buffer is controlled by a 5 bit counter which will point to the one of the 16 available words when the data memory has not been completely filled or emptied and will point to a non-existent word when too many pushes or pops have occurred. The data buffer will also set a flag which indicates whether an overflow or an underflow has occurred. The value of the pointer plus the flag values will allow the user to determine how many pieces of data may have been lost. The device will also contain a master error flag which will indicate that one or more of the data buffers has had an error flag set, which can be read through any port.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A programmable reconfigurable digital crossbar switch, comprising:
   a plurality of multiplexer logic control ports;
   an m-bit internal data bus coupled to each of said multiplexer logic control ports for the interchange of data between any one of said multiplexer logic control ports and any other of said multiplexer control ports, whereby m is an integer greater than zero;
   a plurality of n-bit input/output data buses, each coupled to a respective one of said multiplexer logic control ports for the interchange of data between said multiplexer logic control ports and external devices, whereby n is an integer greater than zero;
   an n-bit port-to-port data transfer data bus sequentially interconnecting said plurality of multiplexer logic control ports in a looping configuration for the interchange of data between adjacent said multiplexer logic control ports; and
   control means operatively coupled to each of said multiplexer logic control ports for controlling a flow of data into and out of each of said multiplexer logic control ports and between each of said multiplexer logic control ports.

2. The digital crossbar switch of claim 1, wherein said control means comprises:
   an n-bit configuration control/memory unit for receiving data from one of said n-bit input/output data buses or from said n-bit port-to-port data transfer data bus and for controlling data transfer functions of said multiplexer logic control port when said port is in a normal operational mode.

3. The digital crossbar switch of claim 2, wherein said control means further comprises an m-bit to n-bit multiplexer operatively connected to said m-bit internal data bus ad controlled by said configuration control/memory unit to select data from any of said plurality of multiplexer logic control ports and output said data on said input/output data bus associated with said multiplexer logic control port.

4. The digital crossbar switch of claim 3, wherein said control means further comprises a control buffer connected in series with said input output data bus and controlled by said configuration control/memory unit to switch said input/output data bus between a mode for inputting data and a mode for outputting data.

5. The digital crossbar switch of claim 4, wherein said control means further comprises a configuration memory multiplexer having a first input coupled to the output of said control buffer, a second input coupled to said n-bit port-to-port data transfer data bus, and an output connected to said configuration control/memory unit, said multiplexer adapted to input data from said input/output data bus to said configuration control/memory unit in a first mode and to input data from a port adjacent said multiplexer logic control port to said configuration control/memory unit in a second mode.

6. The digital crossbar switch of claim 4, wherein said control means further comprises a first in first out data buffer operatively connected between said configuration control/memory unit and said internal data bus, and controlled by said configuration control/memory unit to receive data from said input/output data bus and to transfer said data to said internal data bus.

7. The digital crossbar switch of claim 4, wherein said control means further comprises a first in first out data buffer operatively controlled by said configuration control/memory unit; and a FIFO select multiplexer having a first input operatively connected to the output of said m-bit to n-bit multiplexer, and a second input operatively connected to said input/output data bus, and an output for providing input to said FIFO data buffer, said FIFO select multiplexer operating to select between said first and second inputs and to provide said selected input data to said FIFO data buffer, said FIFO data buffer operating under control of said configuration control/memory unit to provide said selected input data to said internal data bus.

8. The digital crossbar switch of claim 3, wherein said configuration control/memory unit is operatively connected to said n-bit port-to-port data transfer data bus for providing data directly from said configuration control/memory unit an adjacent multiplexer logic control port.

9. The digital crossbar switch of claim 1, wherein said control means further comprises bit reverse logic operatively connected to said internal data bus and operating under control of said configuration control/memory unit to swap bit locations of inputted data in a predetermined pattern and present said bit swapped data back to said internal data bus.

10. The digital crossbar switch of claim 1, wherein said control means further comprises data buffer means for inputting data from said n-bit input/output data bus, said m-bit internal data bus, or said n-bit port-to-port data transfer data bus at a first clock rate and outputting said data to said m-bit internal data bus at a second clock rate.

11. The digital crossbar of claim 10, wherein said first clock rate is faster than said second clock rate.

12. The digital crossbar switch of claim 2, further comprising a global control register for controlling the source of input data transferred into said configuration control/memory unit.

13. A digital crossbar switch, comprising:
    a plurality of memory control ports each having an external data port for receiving and transmitting data on an input/output data bus, an internal data input port for receiving data from a first adjacent one of said plurality of memory control ports, an internal data output port for transmitting data to a second adjacent one of said plurality of memory control ports, and an internal global data port for receiving data from and transmitting data to other said memory control ports;
    an internal port-to-port data transfer data bus sequentially interconnecting said plurality of memory control ports in a looping configuration for carrying data between adjacent said memory control ports, each of said internal data input ports being coupled to the internal data output port of an adjacent one of said memory control ports whereby no one of said internal data input ports is coupled to more than one of said internal data output ports, and no one of said internal data output ports is coupled to more than one of said internal data input ports; and
    an internal global data bus connecting each of said internal global data ports for carrying data between said memory control ports.

* * * * *